United States Patent [19]
Mizzi

[11] Patent Number: 5,770,913
[45] Date of Patent: Jun. 23, 1998

[54] ACTUATORS, MOTORS AND WHEELLESS AUTONOMOUS ROBOTS USING VIBRATORY TRANSDUCER DRIVERS

[75] Inventor: John V. Mizzi, Poughkeepsie, N.Y.

[73] Assignee: Omnific International, Ltd., Poughkeepsie, N.Y.

[21] Appl. No.: 735,713

[22] Filed: Oct. 23, 1996

Related U.S. Application Data

[60] Provisional application No. 60/006,108 Oct. 23, 1995.

[51] Int. Cl.[6] .......................... H02K 11/00; H02K 41/04; H02K 7/06
[52] U.S. Cl. .......................... 310/328; 310/20; 310/68 B
[58] Field of Search .................. 310/15, 20, 309, 310/323, 328, 68 B, 46, 80; 901/1

[56] References Cited

U.S. PATENT DOCUMENTS

| | | | |
|---|---|---|---|
| 3,767,084 | 10/1973 | Bayha | 331/279 |
| 3,929,221 | 12/1975 | Armstrong | 271/267 |
| 4,422,001 | 12/1983 | Weiss | 310/328 |
| 4,782,262 | 11/1988 | Kiyo-Oka | 310/323 |
| 4,853,413 | 8/1989 | Iwata et al. | 310/328 |
| 4,885,515 | 12/1989 | Tamura | 310/323 |
| 4,928,030 | 5/1990 | Culp | 310/328 |
| 5,079,471 | 1/1992 | Nygren, Jr. | 310/328 |
| 5,113,117 | 5/1992 | Brooks et al. | 310/328 |
| 5,136,201 | 8/1992 | Culp | 310/328 |
| 5,283,497 | 2/1994 | Culp | 310/328 |
| 5,315,202 | 5/1994 | LaSota | 310/20 |
| 5,523,643 | 6/1996 | Fujimura et al. | 310/328 |
| 5,585,683 | 12/1996 | Higuchi et al. | 310/309 |
| 5,631,514 | 5/1997 | Garcia et al. | 310/309 |
| 5,661,948 | 9/1997 | Hawkins | 219/121.63 |

Primary Examiner—Clayton E. LaBalle
Attorney, Agent, or Firm—Alfred M. Walker

[57] ABSTRACT

A device providing one of an actuator, motor and a wheelless autonomous robot using vibratory transducer drivers. The vibratory transducer driver is connected to a reciprocating element, driven reciprocally by the vibration driver. A friction surface is provided for translating reciprocating movement of the reciprocating element into motion. A driven member is moved by contact with the friction surface.

22 Claims, 10 Drawing Sheets

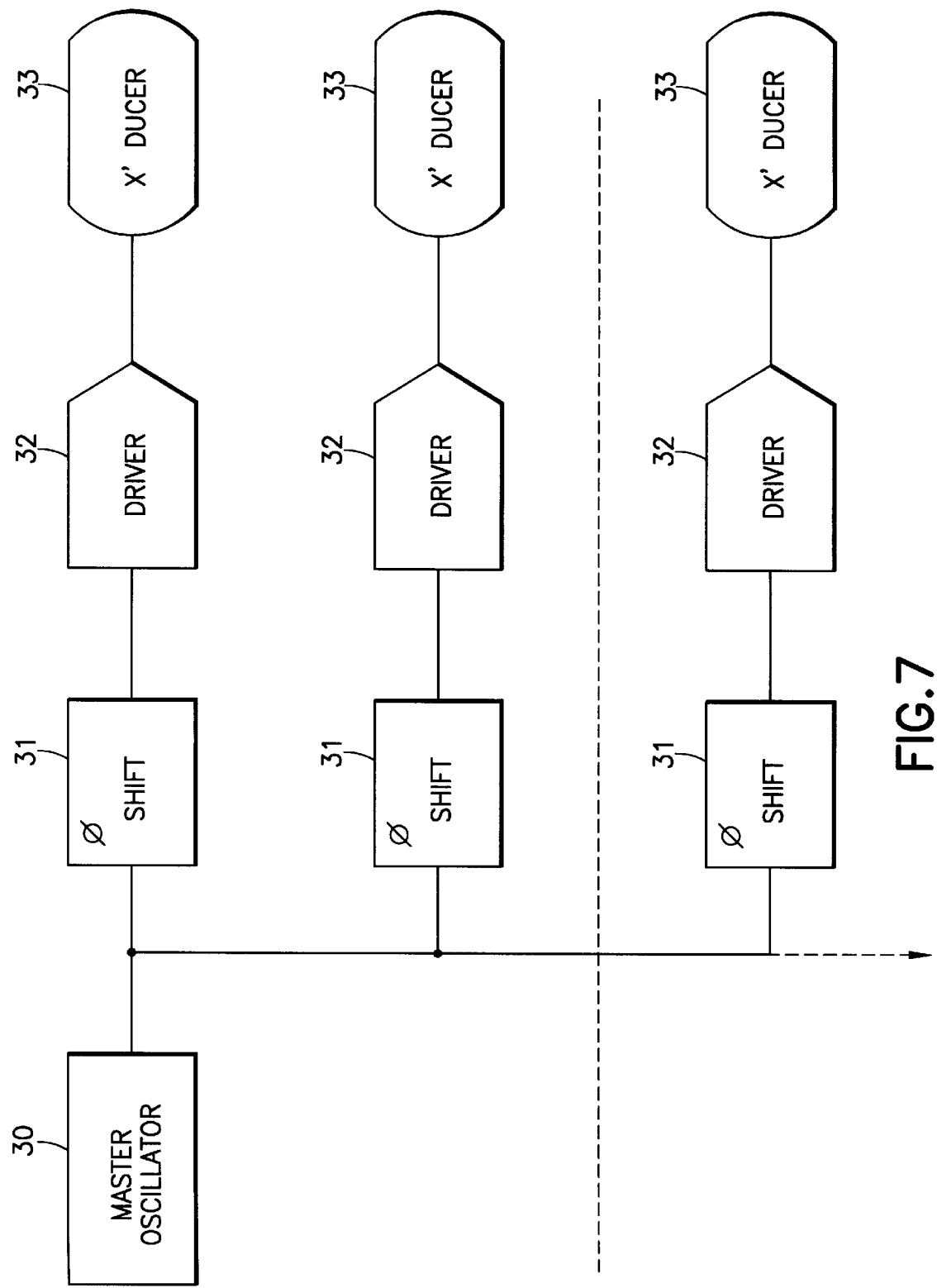

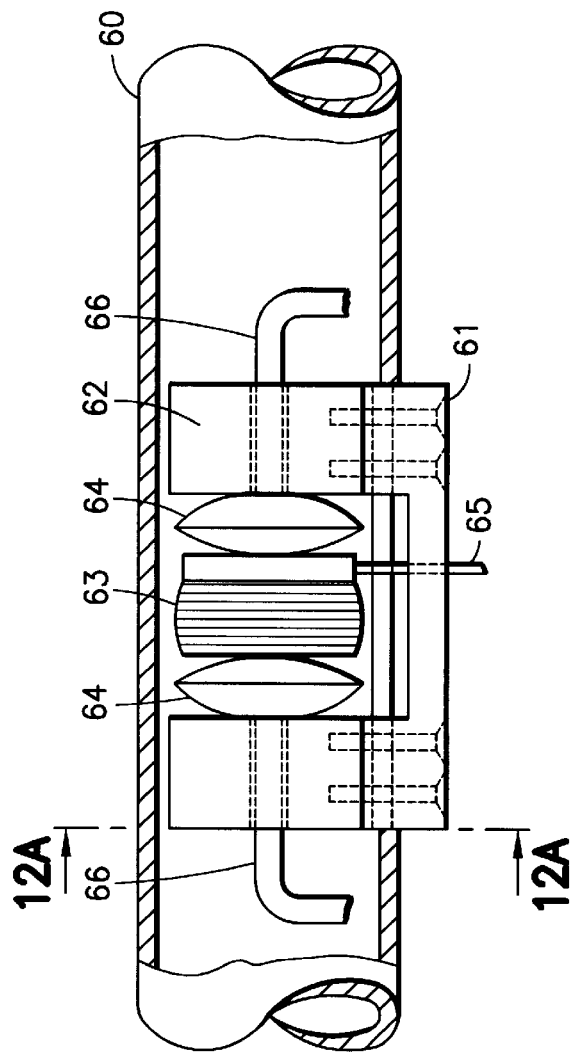
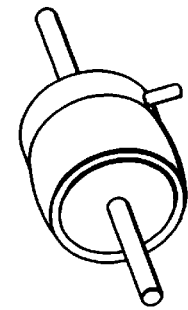
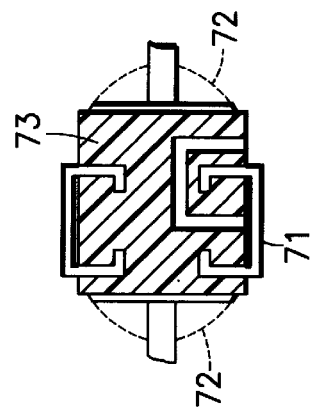
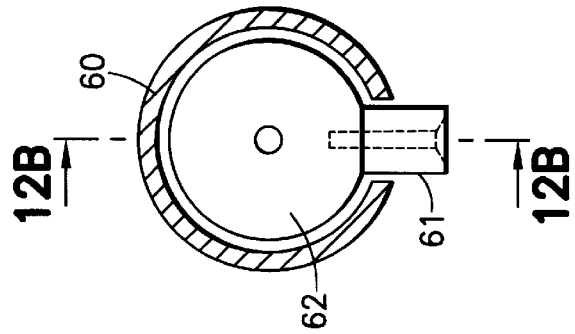

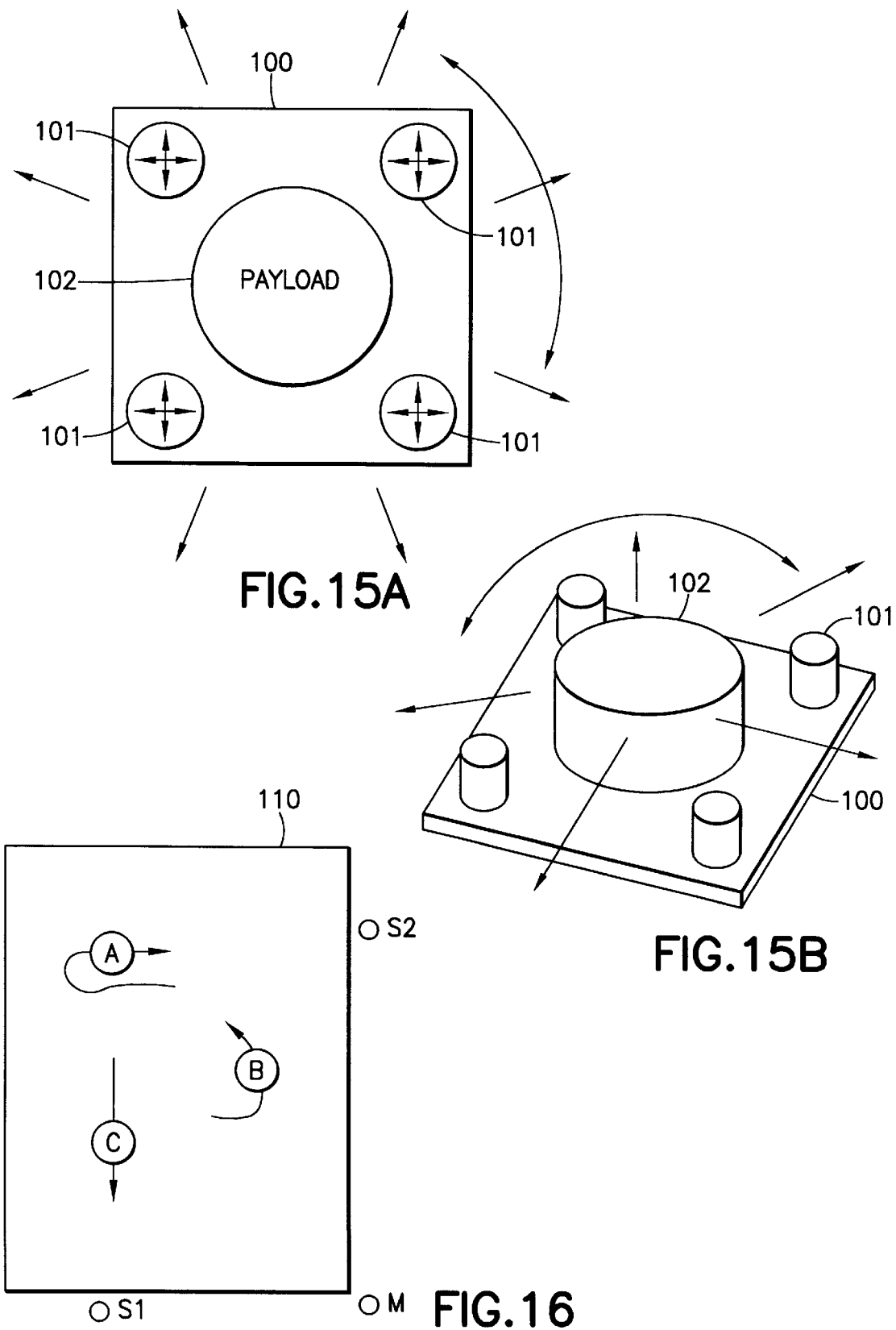

ACTUATORS, MOTORS AND WHEELLESS AUTONOMOUS ROBOTS USING VIBRATORY TRANSDUCER DRIVERS

This is a continuation application of Provisional application Ser. No. 60/006,108 filed Oct. 23, 1995.

FIELD OF THE INVENTION

The invention relates generally to rotary motors and linear actuators. The invention is more particularly related to a special application of this technology to a wheelless autonomous robot.

BACKGROUND OF THE INVENTION

While many different types of rotary motors and linear actuators exist, each has its performance attributes and limitations. Generally, all different types do not exist in a wide range of sizes. Usually they are described by the type of operating power source, such as an electric motor or a pneumatic cylinder or actuator. Some are easy to regulate in speed and direction, while others are not. Costs can vary broadly as well; some technologies are inherently expensive.

Panasonic (Matsushita Corporation), as well as other Japanese manufacturers, makes a line of ultrasonic motors used in some 35 mm cameras in the automatic exposure subassembly. These use surface acoustic waves and Rayleigh interference phenomena. There are many papers in the art and several patents related to this type of motor. This latter technology is basically unrelated to the operation of the motors and actuators of this invention which use vibratory transducers which can span the entire range from subsonic through ultrasonic frequencies.

In the 1970's, 3M Company made a series of nylon fiber products known as Fibre-Tran. While some of the applications related to motion control, motors or actuators were not among the applications discussed in their brochures. The closest application for their oriented fiber products was in overrunning (one-way) clutches.

Prior art related to linear and rotary actuators driven by piezoelectric and other types of vibratory transducers are known themselves. However, they are unrelated to those of the present invention. The closest prior art using vibration and oriented fibers was U.S. Pat. No. 109,698 dated Nov. 29, 1870 entitled "Improvement in Dancing Toys". This patent related to small puppets which would move randomly under the influence of vibrations from the sounding board of a piano-forte.

A stationary conveyor using oriented fibers is commercially produced. A strip of the material is linearly vibrated and used to convey boxes of goods in a manner similar to conveyors using rollers.

U.S. Pat. No. 5,045,741 (Dvorsky) discloses a dual motion actuator in the form of a rotary electric motor with axial movement available simultaneously. While the application described is a combined starter motor and solenoid for automobile engines, if the rotary motion were converted to a torsional vibration, it could be applied to some embodiments of this invention as a pair of orthogonal transducers to be described.

The New Focus Company from Sunnyvale, Calif., produces a piezoelectric transducer driven screw actuator which employs a directionally biased stick/slip behavior controlled by a complex drive waveform of ultrasonic voltage.

Federal Grant Applications

Two federal grant applications relating to some of the topics of this invention were submitted with confidential material. Neither was selected for support. They are identified as follows:

ARPA TRP#9330935 -1 "Novel Actuators and Application to a Wheelless Autonomous Robot".

NASA STTR#94-03-940033 (with SUNY at New Paltz) "Microactuators & Macro Effects"

Summary and Objects of the Invention

It is the primary object of the invention to provide actuators, motors and wheelless autonomous robots using vibratory transducer drivers, which are simple in design robust in construction and economical to manufacture.

It is another object of this invention to create a low cost AC electric motor for low speed, high torque service.

It is a further object of this invention to create reversible rotary and linear actuators with excellent speed control driven by electrical, pneumatic, or hydraulic vibratory transducers.

It is yet another object of this invention to create a low cost linear incremental encoder for use with linear actuators.

It is an object of this invention to create a wheelless autonomous robot driven by vibratory transducers.

It is a further object to define a navigation system usable by autonomous robots.

According to the invention, a device such as an actuator, motor and wheelless autonomous robot, is provided using a vibratory transducer driver. A reciprocating element, driven reciprocally by said vibration driver is provided. The reciprocating element includes a friction surface for translating reciprocating movement of the reciprocating element into motion. A driven member is moved by contact with said friction surface.

The transducer may be any one of an electrostatic "comb" drive, magneto strictive drive, piezoelectric element, electromagnetic element, pneumatic element, hydraulic element and a fuel driven linear engine element.

The driven member may be a rotatable drum, rotatable member or shaft. The friction surface may be provided on a cylindrical portion of said reciprocating element, in contact with a periphery of said drum. The friction surface preferably has anisotropic properties for rotating said drum in one direction upon engagement of said reciprocating element with said friction surface with said drum.

The reciprocating element may be a drive pad with a friction surface provided thereon. The driven member may be one of a driven belt and driven bar in contact with said friction surface whereby movement of said drive pad causes said one of said driven belt and driven bar to be moved linearly in one direction.

If the friction surface is to be provided with anisotropic properties, it may be oriented fiber for engaging with high friction in one direction of movement and engaging with low friction in another direction of movement of the reciprocating element.

The vibratory transducer driver may also be a transducer moving from a central starting point in one direction to a location on one side of said central starting point and reciprocating therebetween in one mode of operation and moving from said central starting point to another point, on an opposite side of said central starting point and reciprocating therebetween in another mode of operation. In this case, the reciprocating element preferably includes a rocking element rocking from a center position to one side and back again in said first mode of operation and rocking from a center point to another side and back again in said second mode of operation, said friction surface being connected to said rocking member. The driven member is then preferably provided in contact with said friction surface and movable in one direction or another, depending upon said mode of operation.

A spring transmission element may be disposed between said transducer and said reciprocating element.. The transmission element is connected to said reciprocating element at one side of said reciprocating element. Another transducer element is provided and another spring element is provided connecting said another transducer element to said reciprocating element at another side of said reciprocating element. The reciprocating element may be a yoke with the friction surface being provided on an interior surface of said yoke. A rotatable element may then form said driven member, said rotatable element being in contact with said friction surface for rotating in one of two directions depending upon the phase difference between said transducer and said another transducer both driven at the same frequency. In this case the reciprocating element, preferably a yoke element, is provided with an interior region having said friction surface. The driven member may also be an output member wherein the output member is in contact with said friction surface for linear movement in one of two directions depending upon a the phase difference between each of said transducer and said another transducer. A control means may be formed of a master oscillator, a phase shifter and a driver connected to each of said transducers. The spring element, said yoke and said rotatable element may be formed of a silicon micromechanical chip. While the direction of the rotary or linear actuators is determined by the relative phase difference between each of the orthogonal transducers, the speed is determined by the amplitude and frequency of the drive transducer as well as the phase difference between it and the contact transducer. The transducer may be an electrostatic "comb" drive. In the other version, the transducer, said spring element, the drive block and the output element are formed of a silicon micromechanical chip. The transducer is again an electrostatic "comb" drive, a piezoelectric element or an electromagnetic type.

A new type of optical rotary linear incremental encoder may be used wherein relative motion between a transparent strip and a tilted array create pulses when the array is illuminated through a strip and wherein a second tilted array is placed affixed distance apart providing aquadrature output. This is a low cost device for use where no rotary to linear conversion is involved.

The transducer may be a vibrating drive bar with friction pads disposed thereon and said driven element may be a moving member. The transducer may include two linear drive elements surrounding a radially expanding bladder element, said radially expanding bladder element having a wear surface, with a fixed yolk disposed on each side of said drive element.

A acylindrical element and a plurality of said transducers are provided at different locations about the cylindrical element, each of the transducers for movement in one of three orthogonal directions. The reciprocating element is supported between said transducers and said cylindrical element. The reciprocating member has the friction surface attached to the base thereof for engagement of a surface supporting said cylinder, whereby said cylinder is said driven member. A plurality of such cylinders may be employed attached to a substrate supporting a pay load. A novel ultrasonic method, known as "SHORAN" may be used to control the resulting wheelless autonomous robot.

The present technology is based on the use of vibratory transducers. Several different embodiments will be discussed. Size is not a limitation in either direction, one implementation is as a silicon micromechanical device. At the other end of the scale, hydraulic, pneumatic, or even fuel powered prime mover transducers can be used to implement motors or actuators of enormous size. Cost can be low if precision and long life are not absolute necessities or if the duty cycle is low; such applications as business machines, home appliances and toys can take advantage of the low cost attribute. Medical applications can take advantage of the size and shape conformability attributes. Speed control capability and design simplicity may be key features in other applications. Drive power source may make the technology attractive for some application since any source of controlled vibration may be utilized.

A wheelless autonomous robot that can vector with zero turning radius is a natural extension of this technology. Such a device could replace a large gantry robot for some specialized applications at a great savings in capital equipment outlay. Consider low lateral force applications such as adhesive lay-up, welding of sheets, laser cutting or water-jet cutting. These operations are key to the use of composite materials in the airframe and marine industries. Since a gantry robot must be sized to the size of the work piece regardless of the payload required, this outlay has impeded the use of composite materials in civilian applications. Wheelless autonomous robots, sized for payload, can roam over these same large sheets performing the same tasks. Two or more autonomous robots can perform a task cooperatively to reduce process time with the correct navigation system. Small autonomous robots with the proper type of navigation system are easy to store and to set up. This is in contrast to the dedicated space required by a gantry robot. The use of autonomous robots in a small batch manufacturing environment with factory space shared serially by a variety of process steps is a natural.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a block diagram of a drive for orthogonal transducers according to the invention;

FIG. 12A is a sectional view taken along line 12A—12A of FIG. 12B of a pneumatically driven linear actuator according to the invention;

FIG. 12B is a sectional view taken along line 12B—12B of FIG. 12A of the pneumatically driven linear actuator according to FIG. 12A;

FIG. 12C is a schematic view of another variant of a pneumatically driven linear actuator according to the invention;

FIG. 12D is a sectional view of the pneumatically driven linear actuator according to FIG. 12C;

FIG. 12E is a perspective view of the pneumatically driven linear actuator according to FIG. 12C;

FIG. 15A is a top view of a robot platform with four elements for vectoring and rotation according to the invention;

FIG. 15 is a perspective view of the robot platform with four elements for vectoring and rotation according to FIG. 15A; and FIG. 16 is a SHORAN navigation layout.

DESCRIPTION OF THE PREFERRED EMBODIMENTS

Figure 1:
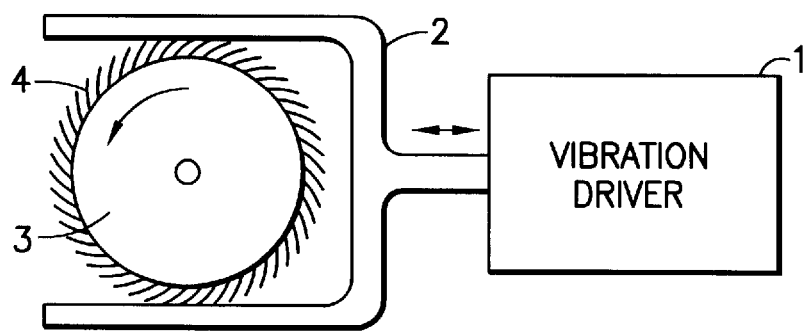
FIG. 1 is a schematic view of a rotary actuator (or motor) according to the invention.

Referring to the drawings in particular, the invention comprises . . .

A vibratory transducer can impart steady rotary or linear motion if it is frictionally coupled to a moving member in a manner such that the coefficient of friction is anisotropic and is a function of direction. The use of a fabric with a layer of oriented fiber as the interface between the vibrating transducer member and the driven member easily implements such a situation. An example of the appropriate material is found in a common type of lint brush which collects lint from clothing when brushing in one direction and deposits it in a clump when the direction is reversed. A better material for the present application is a more coarse version like Fibre-Tran which was produced by 3-M Company. FIG. 1 shows a side view of a rotary motor driven by a vibratory transducer. A vibration driver or transducer 1 is shown driving a yoke member 2 which fits snugly around a rotatable drum or rotor 3 with a surface covered with an oriented fiber material 4. As the yoke 2 moves left and right, the drum 3 turns counter-clockwise. The inside surfaces of yoke 2 in contact with the oriented fiber 4 is high friction, yet the fibers slip easily in one direction while engaging in the other. Consider yoke 2 moving left, the fibers at the top flange engage and drive the drum counter-clockwise while those of the lower flange slip. Now as the yoke 2 direction reverses, the bottom flange drives the drum in the counter-clockwise direction while the top flange slips. Rotor 3 inertia smoothes the speed and carries the motion as the yoke 2 is reversing; note that the fibers slip at both flanges if their relative speed is faster than that of the adjacent flange surface. This is a non-reversing motor that can be driven by any vibration source. Such electrical sources can be electromagnetic, piezoelectric, or electrostatic transducers. Additionally, pneumatic or hydraulic or fuel powered (linear internal combustion engines) may also power the vibratory transducer 1. An electromagnet vibratory transducer such as that used to drive inexpensive aquarium air pumps can be employed to drive a small AC motor of this design. It would result in a motor whose speed is a function of the rotor 3 diameter and the stroke length of the transducer 1 for a fixed mains frequency (with variable frequency, the speed could be varied with frequency as well). In this manner, a low cost, low speed, high torque motor for AC service can be produced; at present a gear train is required with typical induction motors. A working model of this embodiment has been demonstrated using a loudspeaker voice-coil as the transducer 1 with lint brush fabric as the rotor 3 covering 4; it was driven from a step down transformer from 60 hz 115 volts mains.

Figure 2:
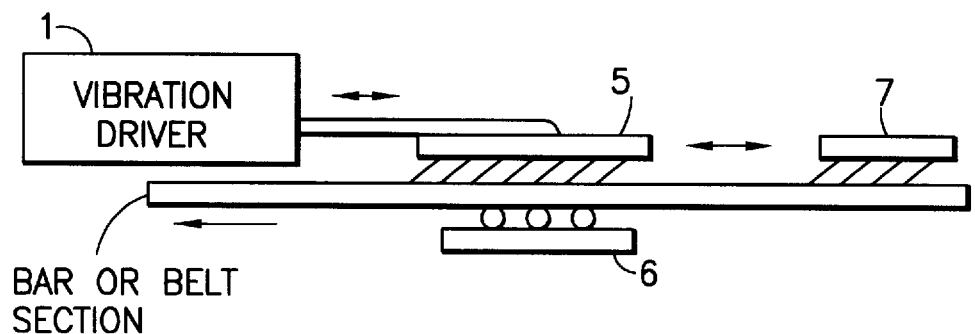
FIG. 2 is a schematic view of a linear unidirectional actuator according to the invention.

FIG. 2 is a side view of a linear unidirectional actuator. While such a configuration is of limited use, some specialized applications with manual return or mechanical end-limit reverser mechanism may exist. It is presented here for completeness. A bar to be moved is contacted by drive pad 5 which has a patch of oriented fiber and is driven by vibratory driver 1. A linear bearing 6 and a stationary anti-backup pad 7 complete the apparatus. Note that the bar can be replaced with a section of drive belt to make this embodiment more practical as a general power driver. The anti-backup pad also has a patch of oriented fiber which slips in the driven direction. This is necessary here because only the left direction stroke drives; as opposed to the rotary motor discussed, the return stroke does not have a drive function. A model of this design, also driven by a loudspeaker transducer element, has been demonstrated in practice.

Figure 3:
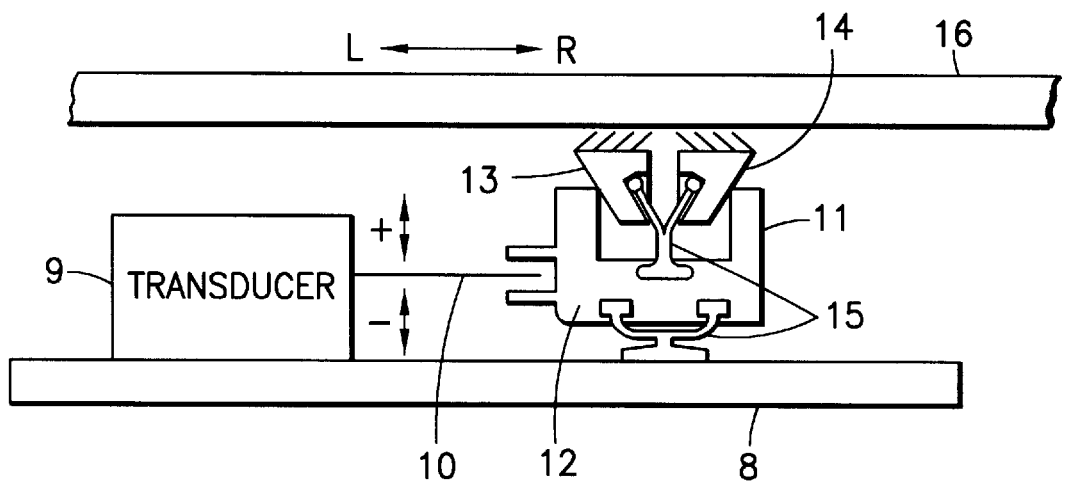
FIG. 3 is a partially schematic view of a reversible linear actuator with single transducer element according to the invention.

FIG. 3 shows a side view of a reversible linear actuator driven by a single transducer 9. The type of transducer is one which can be controlled to vibrate from some neutral position in either of two opposite directions. A familiar example of an electrical version would be a simple voice coil transducer as found in loudspeakers. By actuating it with positive pulses of current (eg. AC with a DC bias), it would vibrate from a neutral position to a certain direction. By reversing polarity and feeding it with negative pulses, it would vibrate from the neutral point to the opposite direction. A pneumatic or hydraulic analog based on a simple diaphragm can also be simply constructed. The vibrating output lever 10 operates a power tip 11 which can be rocked by virtue of the elastomeric mount 15 which attaches it to base 8. Two driving blocks 13 and 14 are in proximity to a movable member 16 which rides in linear bearings (not shown). The two driving blocks 13 and 14 are attached to the rocking power tip chassis 12 with elastomeric member 15. The operation is such that an upward stroke from neutral by member 10 rocks the power tip 11 clockwise causing driving block 13 to contact the moving member 16 as 13 is further moved to the right by the yoke part of chassis 12. This motion moves member 16 to the right through the oriented fiber patch on the contact surface of 13. The oriented fiber on the driving blocks 13 and 14 is not essential but it may enhance the anisotropic frictional force against member 16. As the output lever moves back to the neutral position, block 13 disengages from member 16. Obviously, by vibrating output lever 10 from the neutral position downward, member 16 would be urged to the left instead. Thus the linear actuator is direction controlled by transducer vibration polarity (+ or − directions) and the speed of member 16 is controlled by the amplitude and frequency of the vibration source. In terms of a piezoelectric or electromagnetic transducer 9, this means total simple electrical control of speed and direction.

Figure 4:
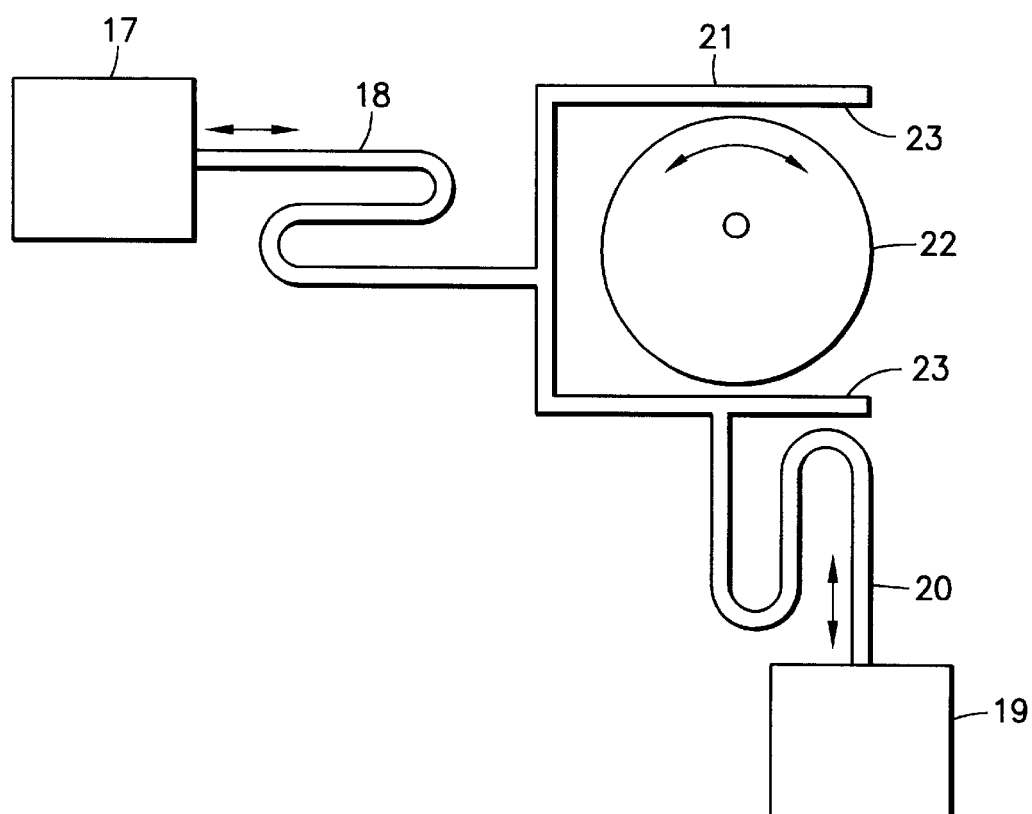
FIG. 4 is a schematic view of a planar design of reversible motor using orthogonal transducers according to the invention.

A more general drive configuration that is not limited to a special drive tip geometry is one involving the use of single or multiple pairs or triples of mutually orthogonal transducers. The transducer elements within each orthogonal set may be simply at right angles to each other in a Cartesian sense, or one may be linear while a second may impart torsional vibration. By using one element of an orthogonal set to control the frictional contact period between the driver and driven element, while another element vibrates in synchronism in the permitted drive directions, both speed and direction can be controlled by selecting the relative phase between the contact and drive transducers. In addition, speed would also be a function of frequency and of the amplitude of the output vibration of the drive transducer or transducers. A simple method of creating an orthogonal pair of transducers would be to mount one transducer housing to a fixed base while the second transducer housing is mounted at right angles to the moving member of the first transducer in a fashion similar to that used in making X-Y tables; this is called a "stacked" configuration. FIG. 4 shows an alternate approach to an orthogonal transducer pair. This is a top view of a planar design of a reversible motor. Vibratory transducers 17 and 19 are mounted on a fixed base at right angles to each other in the same plane. They are connected to a rigid drive yoke 21 with high friction surfaces 23 on the inside of the two flanges. The connecting structures 18 and 20 are spring members with high stiffness in the direction of the vibrations but significant compliance in a direction at right angles to the direction of vibration. It can be appreciated that if transducers 17 and 19 are driven at the same frequency, rotor 22 can be rotated in either direction from a speed of zero to some maximum by simply selecting the phase relation between the contact transducer 19 and the drive transducer 17. Note that in this case, the yoke 21 is sized so that only one flange at a time could contact rotor 22.

Figure 5:
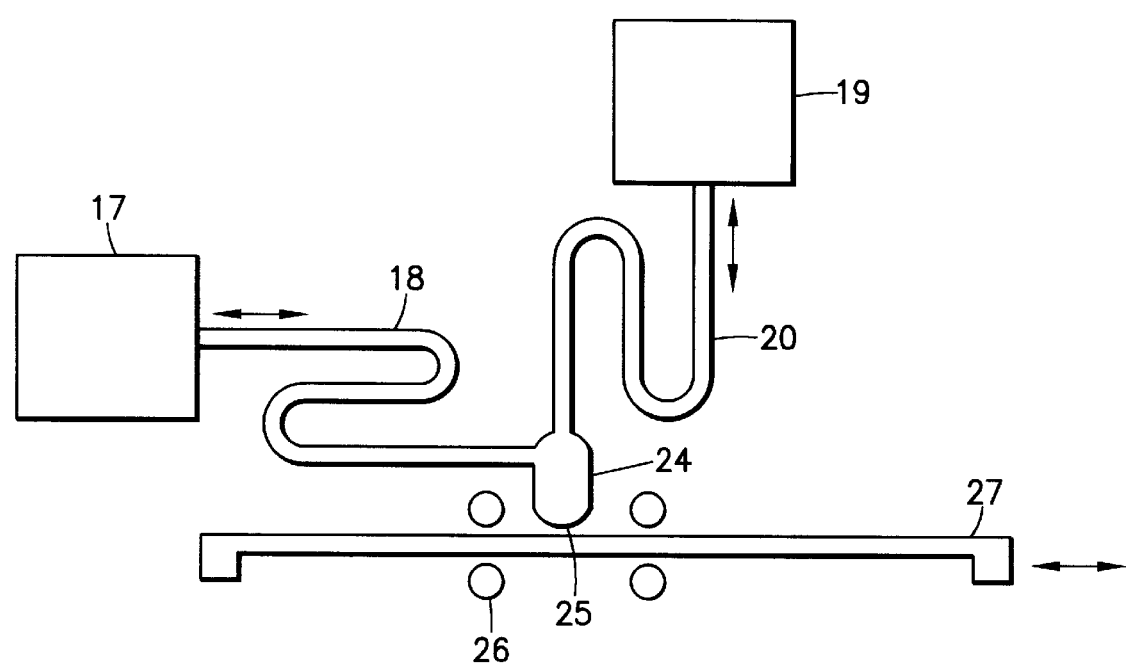
FIG. 5 is a schematic view of a planar design of reversible linear actuator, using orthogonal transducers, according to the invention.
Figure 6A:
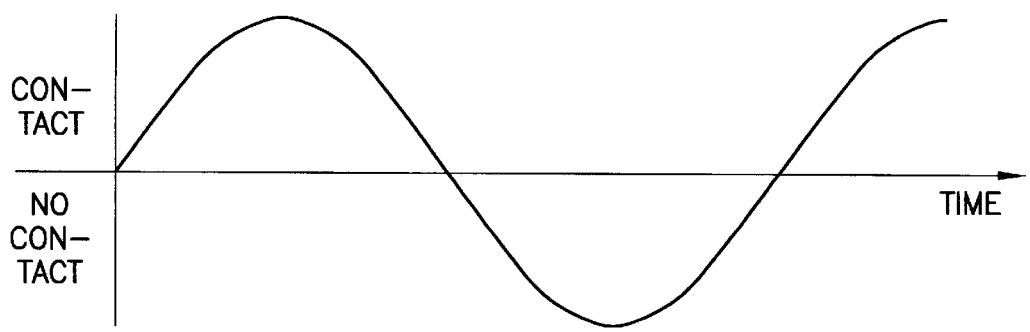
FIG. 6A is a diagram showing phase relationships for direction & speed control.
Figure 6B:
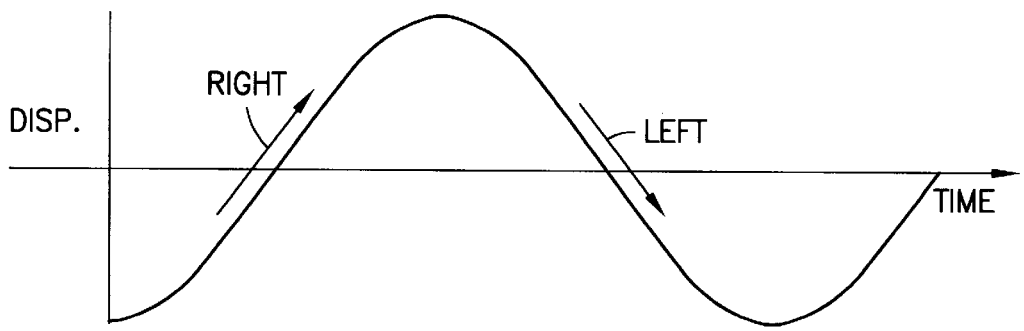
FIG. 6B is a diagram showing phase relationships for direction & speed control.
Figure 6C:
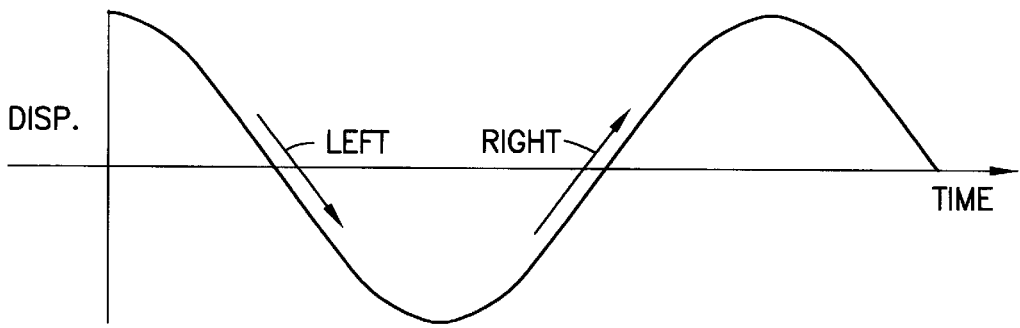
FIG. 6C is a diagram showing phase relationships for direction & speed control.
Figure 6D:
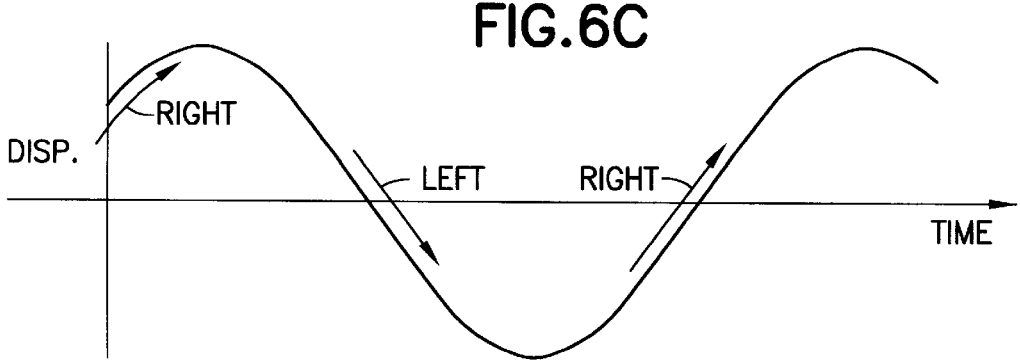
FIG. 6D is a diagram showing phase relationships for direction & speed control.

FIG. 5 shows a top view of a planar design of a reversible linear actuator. It consists of contact transducer 19, and drive transducer 17 both connected to drive block 24 through spring members 20 and 18 respectively. Block 24 has a high friction surface 25 which can alternately contact and non-contact the surface of movable member 27 which rides in linear bearings 26.

A non planar working model reversible linear actuator demonstrating the spring member drive through a common drive block has been constructed. The orthogonal transducer pair consists of two modified 115VAC aquarium pumps whose vibratory output is coupled to a common frictional drive block through flexible plastic sheet members. The driven member is a section of steel shaft running in linear ball bearings. FIG. 6 shows the drive phase relationships via sinusoidal waveforms. The top waveform represents the displacement of the contact transducer 19 while the lower three waveforms represent various phase relationships of the drive transducer 17. In A, it is assumed that contact is achieved during the positive half wave with contact force increasing to the peak. In B we have a waveform that is lagging A by 90 degrees. Thus the full right moving stroke of the drive transducer 17 (from maximum − to maximum +) happens during the contact period. This would result in maximum speed of motion of the output member 27 to the right if the phase relationship is maintained. In C we have a waveform that leads A by 90 degrees. Thus the full left moving stroke of the drive transducer 17 (maximum+ to maximum−) is covered by the contact period. In this case if the phase relationship is maintained, the output member 27 would be driven to the left at maximum speed. In D, the waveform leads by 45 degrees. Note that the contact period covers a short period of right travel and a larger period of left travel; if sustained, this phase relationship would result in a slower motion of member 27 to the left with some minor slippage at the surface 25. Similar operation would result with square waves or trapezoidal drive waveforms. In fact, an optimum drive may mix two different types of waveforms.

FIG. 7 shows a block diagram of a circuit to produce the sinusoidal waveforms. A master oscillator 30 feeds a line of two or more (one for each contact and drive transducer) adjustable phase shifters 31 which feed an amplifier or driver 32 which, in turn, feed the transducer 33. A digital version can provide square waves by substituting a master clock at 30, an adjustable delay single shot at 31 and a high powered fixed pulse single shot for the driver at 32. Pneumatic or hydraulic versions can use motor driven cam valves, pneumatic logic techniques, or solenoid type valves to achieve similar pressure waveforms. Linear engines with variable valve timing can also supply appropriately timed pressure pulses.

Figure 8:
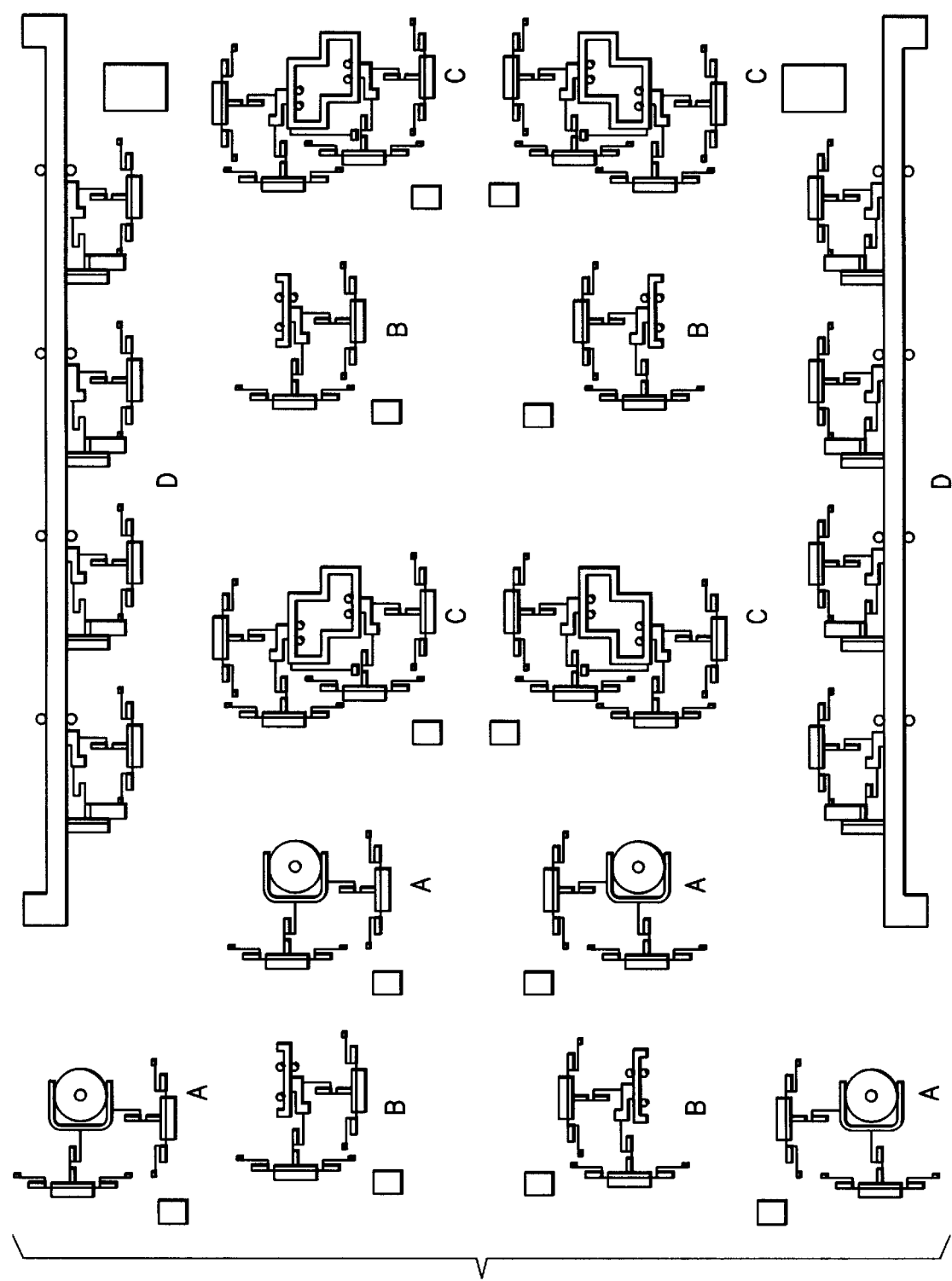
FIG. 8 is a view of a process layer from micromechanical chip design.

FIG. 8 shows a process layer layout from the design of a silicon micromechanical chip using electrostatic "comb" drive vibratory transducers. The design contains 14 reversible rotary and linear actuators that have been fabricated by MCNC as a one cm chip. A is a rotary design like that of FIG. 4, B is a linear actuator like FIG. 5, C is a "two-phase" design using two pairs of orthoginal transducers for a linear actuator, and D is a "four-phase" design. The multiple phase designs are used to impart more uniform motion. Process limitations (MUMPS) demand that all designs be of a planar variety.

Figure 9:
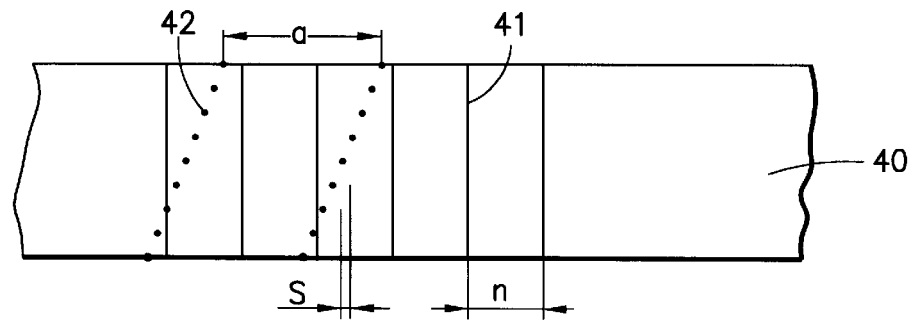
FIG. 9 is a view of a low cost linear incremental encoder.
Figure 10:
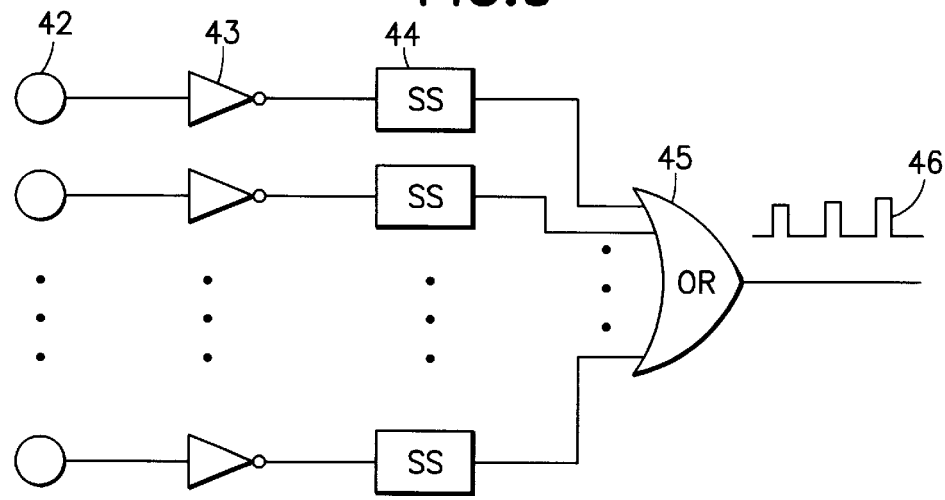
FIG. 10 is a circuit diagram of a decoding of the linear incremental encoder.

When using a rotary motor to derive linear motion (eg. as with a lead screw mechanism), an inexpensive optical or hall effect rotary incremental encoder can be purchased which provides a train of pulses for position and/or speed feedback control. Often two trains of pulses in quadrature are presented for the addition of direction information from the relative phase of the two pulse streams. This encoder is simply attached to the motor which may drive through a gear train. Except for inaccuracies due to backlash in gears or couplings, these are still useful for many applications. No such inexpensive compact linear incremental encoder can be purchased for a linear actuator without a rotary drive member. For direct linear encoder feedback, the lines of resolution for an optical encoder become very close indeed for the required resolution. Optical gratings or machine etched glass scales are often used; they are expensive. Other technologies such as LVDT's tend to be bulky and expensive. To make the linear actuators more attractive for low cost applications, an equally low cost medium resolution incremental encoder has been defined. It is illustrated in FIG. 9 and would provide a train of pulses (optionally duplicated in quadrature) equivalent to those from a low cost optical rotary incremental encoder. The key to the design is to provide a "multiplier" effect of a small linear array of photodarlingtons, photo diodes, or charge-coupled devices (CCD's) 42 placed at a small angle to lines 41 screened by an inexpensive process on a transparent strip 40. Relative motion between the transparent strip and the array would create the pulses when the array is illuminated through the strip. A second array placed a fixed distance apart can be used to supply the quadrature output. The permitted locations for the second array would be a distance "a" such that a=in+s/2. i is an integer, n is the interline spacing on the transparent strip and s is the distance between adjacent dots in the optical array 42 in the direction of motion. FIG. 9 illustrates a 10 element optical array. FIG. 10 shows a circuit for creating the pulse train from an optical array; two such circuits are required for the quadrature output version. 42 is a photodarlington, 43 is a schmidt trigger inverter, 44 is a single shot to provide a constant size pulse, and 45 is an OR circuit which logically OR's all of the single shot 44 outputs to provide wave train 46 as the lines 41 obscure one photodarlington element 42 after another in the array.

Figure 11A:
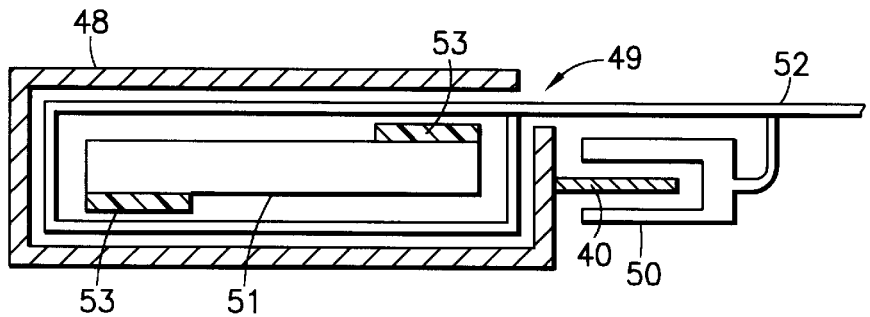
FIG. 11A is a sectional view of a reversible linear actuator with twist mode driver bar according to the invention.
Figure 11B:
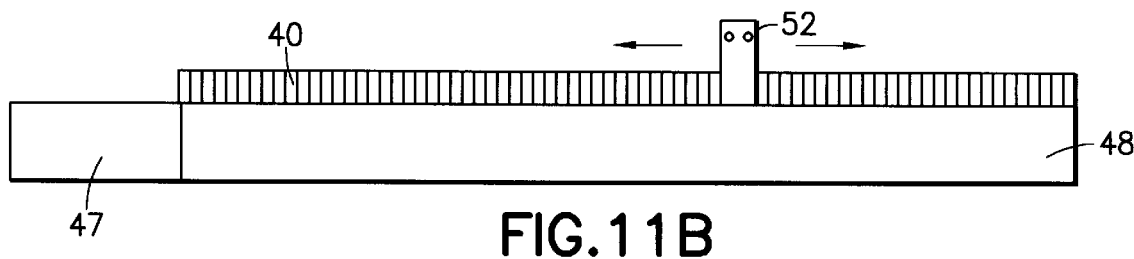
FIG. 11B is a top view of a reversible linear actuator with twist mode driver bar according to FIG. 11A.

FIG. 11A is a sectional view (end crossection) showing a reversible linear actuator using a single orthogonal transducer pair 47 with an attached linear optical incremental encoder of the type described above in FIG. 9. This embodiment uses a long vibrating drive bar 51 which is vibrated in two modes, linearly and torsionally. The torsional vibration is the contact direction which causes contact and non-contact periods between the driven element (moving member) 49 and pads 53 on bar 51. The stationary housing and linear bearing 48 encloses the moving member 49 but permits access to an output attachment tab 52 (see FIG. 11B) through a slot along its length. The incremental encoder array and light source portion 50 is also attached to this output tab 52. The transparent strip with optical lines 40 is fixed to the housing.

FIGS. 12A–12E show several views of a pneumatic linear actuator. In the first embodiment (FIG. 12A and 12B), a separate radially expanding shuttle 63 is moved by a pair of linear drive elements 64 constrained by a fixed yoke 61. In an alternate embodiment (FIGS. 12C–12E), the radially expanding shuttle is combined into a subassembly with two linear motion diaphragms 72 mounted on a lightweight substrate 73. In any case, the fixed yoke 61 has side flanges 62 which also double as linear bearings to locate the movable sleeve 60. The radial member bladder 71 is the "contact" transducer. The two linear drive elements (64 or 72) are always driven in opposite directions such that one is always being vented while the other is being pressurized to achieve the desired drive pulse.

In this manner a pneumatic linear actuator with the speed control of a hydraulic cylinder can be implemented with none of the potential leakage hazards or high cost of the hydraulic implementation. Speed and direction can be exquisitely controlled by selecting the relative phase relationship of the pressure pulses in the radially expanding member in relation to those in the linear drive elements. Speed is also a function of vibratory frequency and amplitude (intensity) of the linear drive element pressure pulses.

Figure 13A:
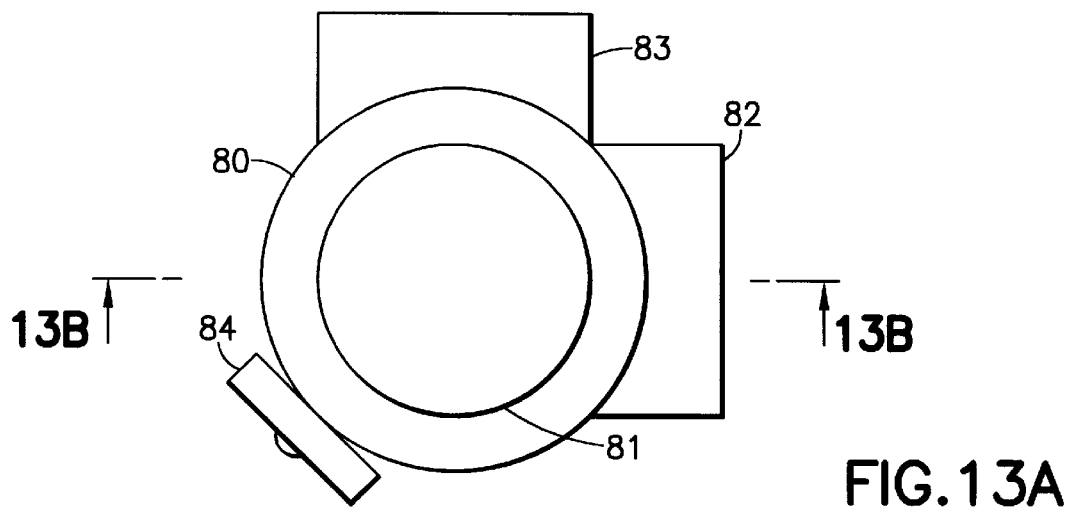
FIG. 13A is a top view of an autonomous robot with spring drive coupling according to the invention.
Figure 13B:
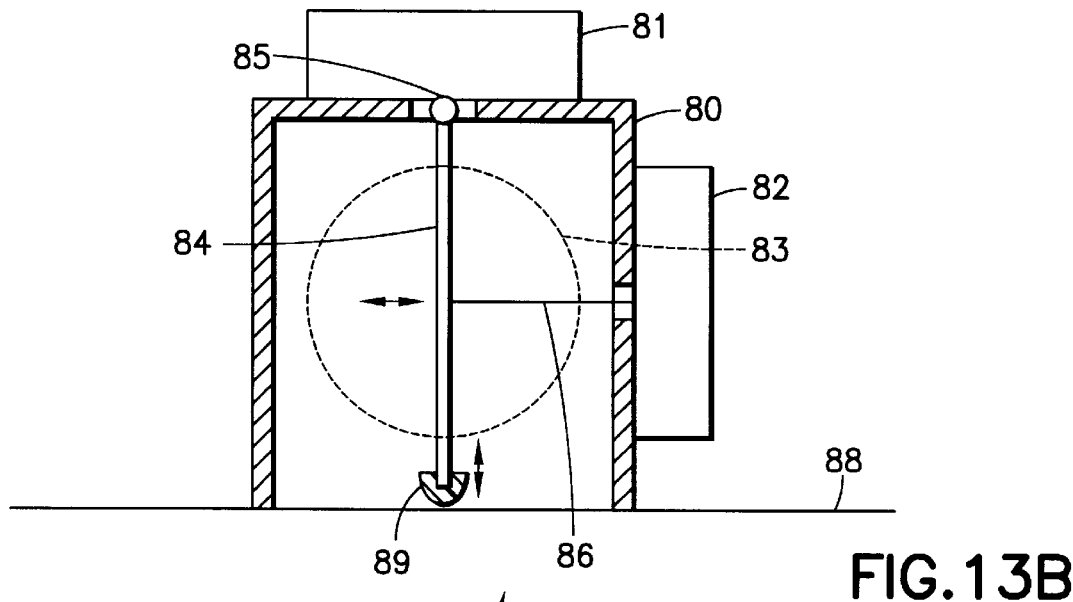
FIG. 13B is a side sectional view of a autonomous robot with spring drive coupling according to FIG. 13A.
Figure 13C:
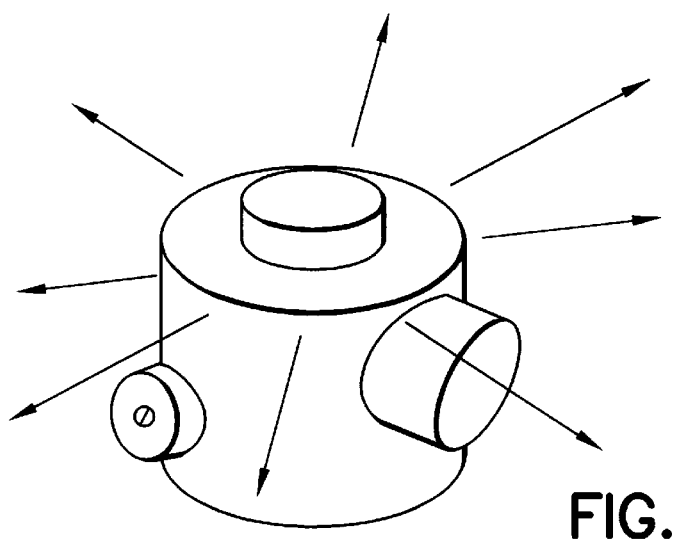
FIG. 13C is a perspective view of a autonomous robot with spring drive coupling according to FIG. 13A.

FIGS. 13A–13C show three views of a wheelless autonomous robot using spring drive elements. The housing 80 includes a cylinder with a top. Three mutually orthogonal vibratory transducers 81, 82 and 83 are attached to the housing. 81, the contact transducer is attached to the top, the two x/y motion transducers 82 and 83 are attached to the sides of the housing. A counterweight 84 is used to offset the weight of the two side mounted transducers. A centrally located rigid output rod 84 is attached to the contact transducer 81 output with either a ball joint or an elastomeric compliant coupling 85. The side mounted transducers are each connected to rod 84 by spring wire 86. In this manner, friction tip 89 can be controlled to periodically contact the ground 88 while transducers 82 and 83 through couplings 86 can cause x and y motions. Note that the spring wire coupling elements 86 can impart substantial push and pull force on rod 84 while being sufficiently compliant in directions at right angles to the axial so as not to interfere with each other or with the up and down motion of rod 84. In view C, the vectoring directions in the plane of 88 are illustrated as selected by the relative phase relationships of the drive waveforms of 81 as related to those of transducers 82 and 83. A working model of this configuration has been constructed using a plastic housing and three small powerful Panasonic loudspeakers as the three mutually orthogonal transducers.

Figure 14A:
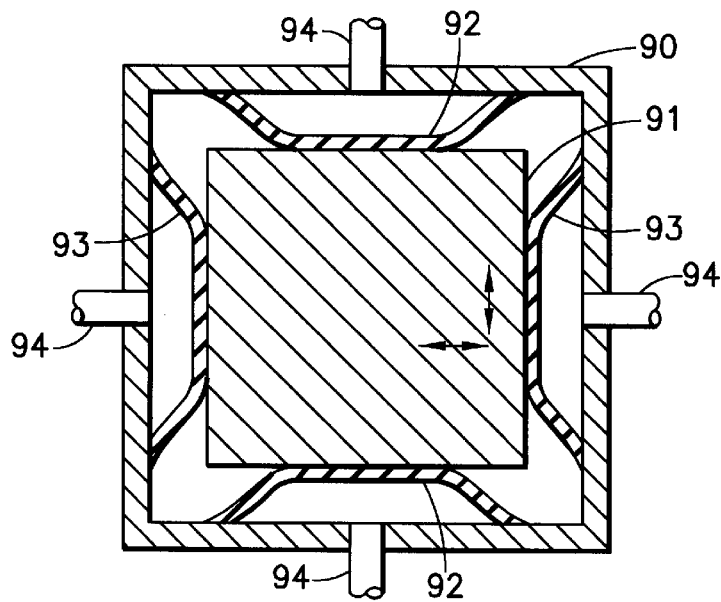
FIG. 14A is a top sectional view of a pneumatically driven wheelless autonomous robot element according to the invention.
Figure 14B:
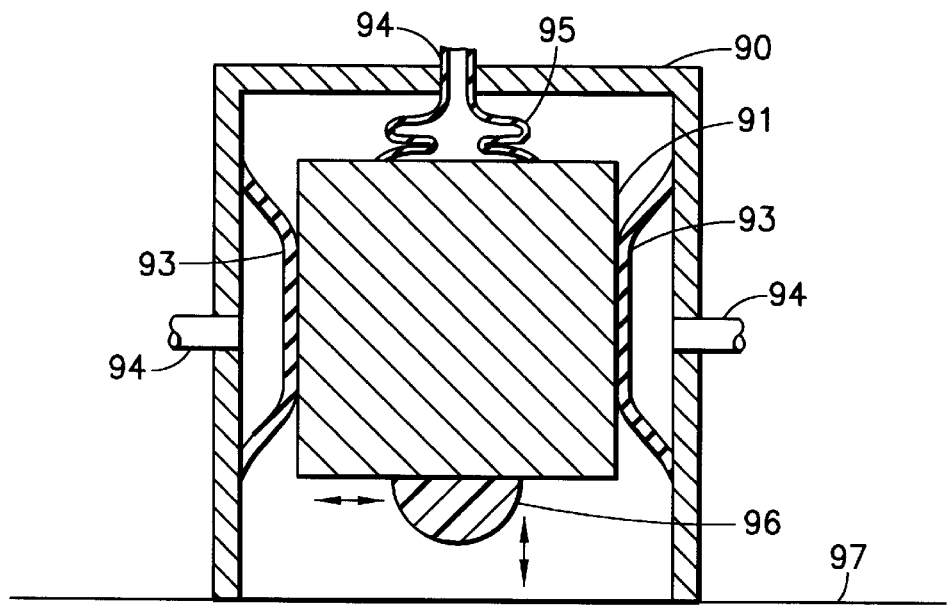
FIG. 14B is a side sectional view the pneumatically driven wheelless autonomous robot element according to FIG. 14A.
Figure 14C:
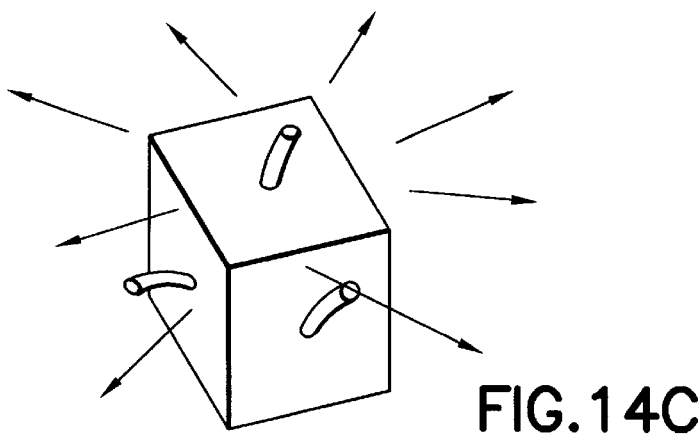
FIG. 14C is a perspective schematic view of the pneumatically driven wheelless autonomous robot element according to FIG. 14A.

FIGS. 14A–14C show three views of a pneumatic wheelless autonomous robot. The general shape is that of a drive cube within a hollow cube housing. The housing 90 is a square crossection tube with a top. On the inside of the sides are two pairs of elastomeric pneumatic diaphragms 93 and 92. Inside the housing is driven block 91 attached to a pneumatic bellows 95 at the top. A hemispherical friction foot 96 is attached to the bottom of block 91. It can be appreciated that contact with the ground can be regulated with the inflation or deflation of bellows 95 which also acts as a tension spring to lift block 91 from contact with the ground 97 when it is deflated. Diaphragm pair 92 can move block 91 relative to housing 90 in the "y" direction by controlling the air pressure through hoses 94. Diaphragm pair 93 similarly controls the movement of block 91 in the "x" direction. The diaphragms in a pair are always operated differentially such that one is venting while the opposite is filling with air. By judicious control of the phase of diaphragm pairs 92 and 93 relative to contact bellows 95, vectoring in any direction on plane 97 is possible as illustrated in part C. Two different primitive pneumatic wheelless autonomous robots have been demonstrated. One is a plywood platform containing a pneumatic bladder for contact control carrying (in "stacked" manner) a small pneumatic cylinder with attached friction foot. This "robot" has only two orthogonal transducers and can only hop forward or backward. On the platform are also a small reserve tank of air and two solenoid valves and a quick dump slave valve to quickly evacuate the bladder. Remotely are a supply tank with 20 to 30 psig air connected by a flexible hose to the robot as well as two micro switches controlled by adjustable cams driven by a hand crank. The switches control the 3-way solenoid valves on the robot which can be demonstrated to hop forwards or backwards when the crank is rotated in the same direction as a function of the relative phase relationship of the cams driving the microswitches. A second pneumatic robot which moves extremely slowly but illustrates vectoring has also been constructed using plastic bellows.

While FIGS. 13A–C and 14A–C illustrate wheelless autonomous robot elements which can vector in a plane, a more useful robotic platform using four such elements 101 is illustrated in FIGS. 15A and 15B. A payload 102 is shown in the center of platform 100. In this configuration, the platform can vector in any direction by simultaneous slaving of the four robotic element 101 controls, but rotation in place or any such combination of movements can also be accomplished by individual custom control of the individual robotic elements. Similar operation but with more complex control algorithms can be accomplished with a minimum of three robotic elements on a triangular platform.

FIG. 16 shows a SHORAN navigation method for autonomous robots. A, B and C are robots on work area 110 where M is the master station and S1 and S2 represent two slave stations. SHORAN is a navigational technique for SHOrt RANge use. It is not used in the normal navigational sense, but as a method of providing positional feedback for one or more autonomous robots at work on a plane surface. The name is a takeoff on LORAN which is a LOnge RANge navigational technique based on the use of radio beacons. The technique uses a master station and two slave stations, and the location is plotted by using "hyperbolas of constant delay". By substituting ultrasonics for the radio beacons, time delays for signal propagation at MACH 1 are multiplied by almost 6 orders of magnitude relative to those of radio beacons at the speed of light thereby creating a better match between a navigational system originally designed to cover many miles and the present application for providing precise location in the range up to a few hundred feet. Using a stationary robot (such as a gantry type), the end effector is attached to arms which have a ready inertial reference; position is determined by the excursion of the effector from the "home" position of the arms. SHORAN attempts to provide the same service for one or more free ranging robots which have no inherent inertial reference.

While specific embodiments of the invention have been shown and described in detail to illustrate the application of the principles of the invention, it will be understood that the invention may be embodied otherwise without departing from such principles.

What is claimed is:

1. A device, comprising:

a first vibratory transducer;

a second vibratory transducer orthogonal to said first vibratory transducer;

means to attach said first vibratory transducer to a driving member;

further means to attach said second vibratory transducer to said driving member;

a driven member moved relative to said driving member by said driving member through frictional forces;

both said first vibratory transducer and said second vibratory transducer driven at an identical frequency with an ability to selectively set the phase relationship between said first vibratory transducer and said second vibratory transducer for the purpose of selecting direction of movement and the speed of said driven member.

2. A device according to claim 1 further comprising:

said means to attach said first vibratory transducer being a first spring transmission element disposed between said first vibratory transducer and said driving member, said first spring transmission element being connected to said driving member at one side of said driving member;

said further means to attach said second vibratory transducer to said driving member being another spring transmission element connecting said second vibratory transducer to said driving member at an orthogonal side of said driving member, said driving member being a yoke with a friction surface being provided on two sides of an interior surface of said yoke; and a rotatable drum forming said driven member, said rotatable drum being in contact with said friction surface for rotating in one of two directions depending upon the relative phase relationship between each of said first vibratory transducer and said second vibratory transducer, and said a rotatable drum forming said driven member placed within said yoke with the ability to contact one or another side of said interior surface on different parts of a vibratory cycle.

3. A device according to claim 2, further comprising control means including a master oscillator, a phase shifter and a driver connected to each of said transducers.

4. A device according to claim 2, wherein said transducer, said spring element, said yoke and said rotatable element are formed of a silicon micromechanical chip, wherein said first vibratory transducer and said second vibratory transducer is one of an electrostatic "comb" drive, a piezoelectric element, and an electromagnetic element.

5. A device according to claim 2, wherein said first vibratory transducer and second vibratory transducer is one of an electrostatic "comb" drive, magneto strictive drive, piezoelectric element, electromagnetic element, pneumatic element, hydraulic element and a fuel driven linear engine element.

6. A device according to claim 1 further comprising:

said means to attach said first vibratory transducer to a driving member being a spring transmission element disposed between said first vibratory transducer and said driving member, said spring transmission element connected to said driving member at one side of said driving member;

another spring transmission element connecting said second vibratory transducer to said driving member at an orthogonal side of said driving member, said driving member being a drive block with a friction surface being provided on said drive block; and said driven member being in contact with said friction surface for movement in one of two directions depending upon the relative phase relationship between each of said first vibratory transducer and said second vibratory transducer, and said driven member further being an output bar guided in linear bearings.

7. A device according to claim 6, further comprising control means including a master oscillator, a phase shifter and a driver connected to each of said transducers.

8. A device according to claim 6, wherein said transducer, said spring element, said drive bar and said output member are formed of a silicon micromechanical chip.

9. A device according to claim 8, wherein said first vibratory transducer and said second vibratory transducer is one of an electrostatic "comb" drive, a piezoelectric element, and an electromagnetic element.

10. A device according to claim 1, wherein two vibratory transducers drive a long bar with friction pads disposed thereon in both a torsional and longitudinal vibratory mode imparting motion to said driven member in either direction as selected by the relative phase relationship between the urging mediums of said transducers, said first vibratory transducer vibrating in a linear fashion, said second vibratory transducer vibrating in a torsional fashion orthogonal to said linear vibration of said first vibratory transducer.

said driving member being a bar with friction pads disposed thereon; and said driven member being a hollow cylinder of rectangular cross section housing said bar.

11. A device according to claim 10, further comprising an incremental linear optical encoder comprising an encoder, said encoder attached to and used with linear actuators wherein relative motion between a transparent strip with regular lines and an array of light detecting elements tilted at an oblique angle to said lines create output pulses indicative of said relative motion and with resolution n times that of the interline spacing on said transparent strip where n is the number of light detecting elements in said array of light detecting elements.

12. A device according to claim 11, wherein a second array of light detecting elements tilted at the same angle and identical to said array of light detecting elements is placed at a strategic distance from said array of light detecting elements so as to provide quadrature output of pulses relative to those produced by said array of light detecting elements so as to infer direction information.

13. A device according to claim 11 wherein said light detecting elements are one of photo diodes, photo transistors, photo darlingtons, and charge-coupled devices (CCD's).

14. A device according to claim 1, wherein said device is a bi-directional linear pneumatic actuator and, said first vibratory transducer being a pair of a pair of pneumatic diaphragms supplied with pulsating compressed air anchored to a stationary yoke.

said second vibratory transducer being said radially expandable bladder member having a frictional surface on its periphery supplied with pulsating compressed air, said bladder member being linearly reciprocated by said pair of pneumatic diaphragms which are placed on either side of said bladder member, said driving member being said frictional surface on said radially expandable bladder, and, said driven member including a hollow cylindrical member encircling said radially expandable bladder.

15. A device according to claim 1, further comprising a third vibratory transducer being disposed such that said first vibratory transducer, said second vibratory transducer and said third vibratory transducer are disposed at three mutually orthogonal locations of a cylindrical element, said driving member being a rod with a friction tip at its distal end;

said third vibratory transducer being attached to a proximal end of said rod via a coupling, said third vibratory transducer reciprocating said rod in a vertical direction, such that said friction tip periodically contacts a supporting surface through an open end of said cylinder.

said cylinder being said driven member with an ability to vector in any direction on a plane as determined by the relative phase relationship among said three vibratory transducers constituting a primitive autonomous robot.

16. A device according to claim 1, further comprising a a third vibratory transducer being disposed such that said first vibratory transducer, said second transducer and said third vibratory transducer, are disposed at three orthogonal locations of a cylindrical element said cylindrical element being hollow and having a square cross section, said driving member being a block with a friction tip at a bottom end thereof, said third vibratory transducer being a bellows attached between an inside top surface of said cylinder and a top end of said block, said third vibratory transducer reciprocating said block in a vertical direction by pulses of compressed air such that said friction tip periodically contacts a supporting surface through an open end of said cylinder, said first vibratory transducer and said second vibratory transducer being pairs of diaphragms, supplied with pulses of compressed air, attached to orthogonal internal sides of said cylindrical element and contacting adjacent surfaces of said driving block for the purpose of linear movement therein.

said cylinder being said driven member with an ability to vector in any direction on a plane as determined by the he relative phase relationship among said three vibratory transducers, constituting a primitive autonomous robot.

17. A device according to claim 16, wherein a plurality of said cylinders are provided attached to a substrate supporting a pay load and providing a wheelless autonomous robot the further ability to rotate in addition to vectoring in a plane.

18. A device according to claim 17, wherein a short range navigation system is used to guide said wheelless autonomous robot, said short range navigation system using ultrasonic transmitters and receivers in a system that operates in a similar fashion to the well known long range navigation system (LORAN) which uses radio beacons, said ultrasonic communications means taking advantage of greatly increased signal propagation delays of the medium (the speed of sound) relative to said radio beacons (the speed of light) to convert the LORAN system to said short range navigation system for practical use in short range robot navigation.

19. A low-speed high-torque alternating current motor comprising:

a vibratory transducer, a yoke member having friction surfaces on interior surfaces of said yoke member, and, a drum having a periphery thereof covered with anisotropic friction material such as oriented fiber, said yoke member contacting said drum periphery with said interior friction surfaces of said yoke, said transducer linearly reciprocating said yoke thereby rotating said drum in one direction, wherein motor speed of said motor is adjustable by varying either the stroke of the said vibratory transducer or the frequency of the alternating current supply or both.

20. A bidirectional linear actuator comprising a vibratory transducer, a driven bar, and a rocking power tip comprised of a plurality of hardened parts, a chassis and a first and second drive block, said chassis being resiliently bonded to a base and to each of said drive blocks by elastomeric elements, said transducer being rigidly bonded to said base, said transducer being controllable to vibrate from a neutral position to either of two opposite directions depending on the direction of the driving power source, said first drive block having a surface adjacent to said driven bar covered with an anisotropic friction material such as oriented fiber in a specific direction, said second drive block having a surface adjacent to said driven bar covered with an anisotropic friction material such as oriented fiber in a direction opposite to that of said first drive block, said transducer being coupled to said chassis member such that in a first mode of operation, said chassis member is rocked from a neutral position in a clockwise rotation and then back to neutral, wherein, in said first mode, said first drive block contacts said driven bar through said anisotropic friction surface and moves said bar to the right a small distance with each vibration, and wherein, in a second mode of operation, said transducer causes said chassis member to rotate from a neutral position in a counter-clockwise rotation and then back to neutral with each vibration, wherein further, in said second mode of operation said second drive block contacts said driven bar through said anisotropic friction surface and moves said driven bar to the left a small distance with each said vibration.

21. A device according to claim 20, wherein said driving power source is electric and said direction of the driving power source is the electrical polarity sent to said transducer which an electrical type such as electromagnetic or piezoelectric transducers.

22. A device according to claim 20, wherein said driving power source is fluidic and said direction of the driving power source is the direction of fluid to and from said transducer which is a fluid type such as a cylinder, bellows or diaphragm.

* * * * *